United States Patent
Chalupa et al.

(10) Patent No.: US 8,950,436 B2
(45) Date of Patent: Feb. 10, 2015

(54) MODULARLY STRUCTURED FLOW CONDITIONING UNIT

(75) Inventors: Stefan Chalupa, Schoental (DE); Johann Gunnesch, Waldenburg (DE); Gunter Kabisch, Niedernhall (DE); Jan Schuler, Niedernhall (DE)

(73) Assignee: Buerkert Werke GmbH, Ingelfingen (DE)

( * ) Notice: Subject to any disclaimer, the term of this patent is extended or adjusted under 35 U.S.C. 154(b) by 1090 days.

(21) Appl. No.: 12/836,631

(22) Filed: Jul. 15, 2010

(65) Prior Publication Data

US 2011/0011479 A1    Jan. 20, 2011

(30) Foreign Application Priority Data

Jul. 17, 2009    (DE) ..................... 20 2009 009 760 U

(51) Int. Cl.
| | |
|---|---|
| *F16L 55/027* | (2006.01) |
| *G05D 7/01* | (2006.01) |
| *G01F 15/00* | (2006.01) |
| *F15D 1/00* | (2006.01) |
| *G01F 1/68* | (2006.01) |
| *G01F 1/684* | (2006.01) |

(52) U.S. Cl.
CPC .............. *G01F 15/00* (2013.01); *F15D 1/0015* (2013.01); *G01F 1/68* (2013.01); *G01F 1/6842* (2013.01)
USPC .................................. 138/45; 138/46; 138/40

(58) Field of Classification Search
USPC ........................................ 138/45, 46, 111, 40
See application file for complete search history.

(56) References Cited

U.S. PATENT DOCUMENTS

| | | | | |
|---|---|---|---|---|
| 3,071,160 | A * | 1/1963 | Weichbrod | 138/40 |
| 3,244,002 | A * | 4/1966 | Prono et al. | 73/198 |
| 3,630,444 | A * | 12/1971 | Nelson | 239/29 |
| 3,630,455 | A * | 12/1971 | Parkison | 239/533.14 |
| 3,840,051 | A * | 10/1974 | Akashi et al. | 138/37 |
| 4,368,779 | A * | 1/1983 | Rojey et al. | 165/165 |
| 4,391,898 | A * | 7/1983 | van der Velden | 430/306 |
| 4,601,928 | A * | 7/1986 | van der Velden | 428/36.2 |
| 4,781,536 | A | 11/1988 | Hicks | |
| 5,184,641 | A * | 2/1993 | Kuhn | 137/504 |
| 5,253,517 | A * | 10/1993 | Molin et al. | 73/114.32 |
| 5,332,005 | A * | 7/1994 | Baan | 138/43 |
| 5,529,093 | A * | 6/1996 | Gallagher et al. | 138/44 |
| 5,803,368 | A * | 9/1998 | Shekalim | 239/428.5 |
| 5,816,497 | A * | 10/1998 | Leon et al. | 239/76 |

(Continued)

FOREIGN PATENT DOCUMENTS

| | | |
|---|---|---|
| DE | 19705660 | 8/1998 |
| DE | 19705660 A1 * | 8/1998 |
| DE | 20208716 U1 | 10/2003 |

OTHER PUBLICATIONS

Machine Translation of DE 19705660.*

(Continued)

*Primary Examiner* — Paul R Durand
*Assistant Examiner* — Vishal Pancholi
(74) *Attorney, Agent, or Firm* — Carlson, Gaskey & Olds, PC

(57) ABSTRACT

A modularly structured unit is comprised of a flow resistance element and an orifice plate adjacent thereto, preferably for use in the main flow duct of a thermal mass flow rate measuring or control device. The flow resistance element can be combined with various orifice plates having different opening diameters.

19 Claims, 3 Drawing Sheets

(56) References Cited

U.S. PATENT DOCUMENTS

| | | | |
|---|---|---|---|
| 5,837,903 A * | 11/1998 | Weigand | 73/861.42 |
| 5,922,970 A | 7/1999 | Ohle | |
| 6,112,590 A * | 9/2000 | Rilling | 73/204.21 |
| 2004/0123672 A1* | 7/2004 | Wang | 73/861.21 |
| 2007/0131296 A1* | 6/2007 | Schinazi et al. | 138/43 |
| 2007/0144599 A1* | 6/2007 | Bivin | 138/37 |

OTHER PUBLICATIONS

German Search Report dated Dec. 16, 2009.
European Search Report dated Sep. 3, 2010.

* cited by examiner

MODULARLY STRUCTURED FLOW CONDITIONING UNIT

RELATED APPLICATION

This application claims priority to German Application No. 20 2009 009 760.9, which was filed 17 Jul. 2009.

FIELD OF THE INVENTION

The present invention relates to a modularly structured flow conditioning unit made up of a flow resistance element and an orifice plate adjacent thereto, preferably for use in a main flow duct of a thermal mass flow rate measuring or control device.

BACKGROUND

In mass flow rate measuring and control devices, flow resistance elements are used for generating as laminar a flow as possible. These elements produce a low pressure drop which causes a volume flow rate via a bypass duct which is arranged parallel to the principal duct and in which the flow rate sensor is disposed. With a laminar flow, there exists a linear connection between the volume flow rate in the bypass duct and the pressure drop produced by the flow resistance.

In dependence on the desired flow rate per unit of time, flow resistance elements having different opening diameters are required: a small flow resistance is required for high volume flow rates, whereas a high flow resistance is needed for low volume flow rates. According to the prior art, a whole range of flow resistance elements is therefore provided for a mass flow rate measuring and control device, which is involved and expensive.

SUMMARY

A modular flow conditioning element includes a flow resistance element which is built up of a multitude of parallel ducts having large opening cross-sections and which cooperates with orifice plates of different opening diameters. As a result, the desired flow range is continuously adjustable using just one single flow resistance element. Costs are reduced considerably because orifice plates having different bore diameters are simple and inexpensive to produce.

Flow resistance elements usually consist of a multitude of parallel ducts with dividing walls disposed therebetween. They can be manufactured in one piece, for example from a cylinder section, by producing bore holes therein. In these methods, the possible number of ducts is limited for manufacturing reasons, and it is difficult to adhere to small tolerances. Further known is a structure made up of a plurality of disks disposed behind each other, with grooves applied in the individual disks constituting ducts in the disk stack.

Undesirable turbulences may occur at the entrance and exit openings of the ducts, as caused by a sudden narrowing or widening of cross-section. The modular flow conditioning element therefore provides a flow resistance element which is built up of a multitude of parallel ducts, with the walls that define the ducts having very small wall thicknesses. The wall thicknesses typically are in the range of from 0.5 mm to 0.05 mm.

In one example, the flow resistance element is produced by photopolymerization from a plastic material by growing in layers over an appropriate mask. This has the advantage that the desired small wall thicknesses can be realized, very small tolerances can be observed, and almost any desired duct geometries can be implemented.

A flow resistance element having approximately trapezoidal duct cross-sections has turned out to be an advantageous variant.

The orifice plate may be arranged upstream or downstream of the flow resistance element in the main flow duct of a thermal mass flow rate measuring or control device, which has the advantage of a simple assembly which is therefore not prone to error.

BRIEF DESCRIPTION OF THE DRAWINGS

Further advantages and configurations of the invention will now be described with reference to the accompanying drawing figures, in which.

DETAILED DESCRIPTION

Figure 1:
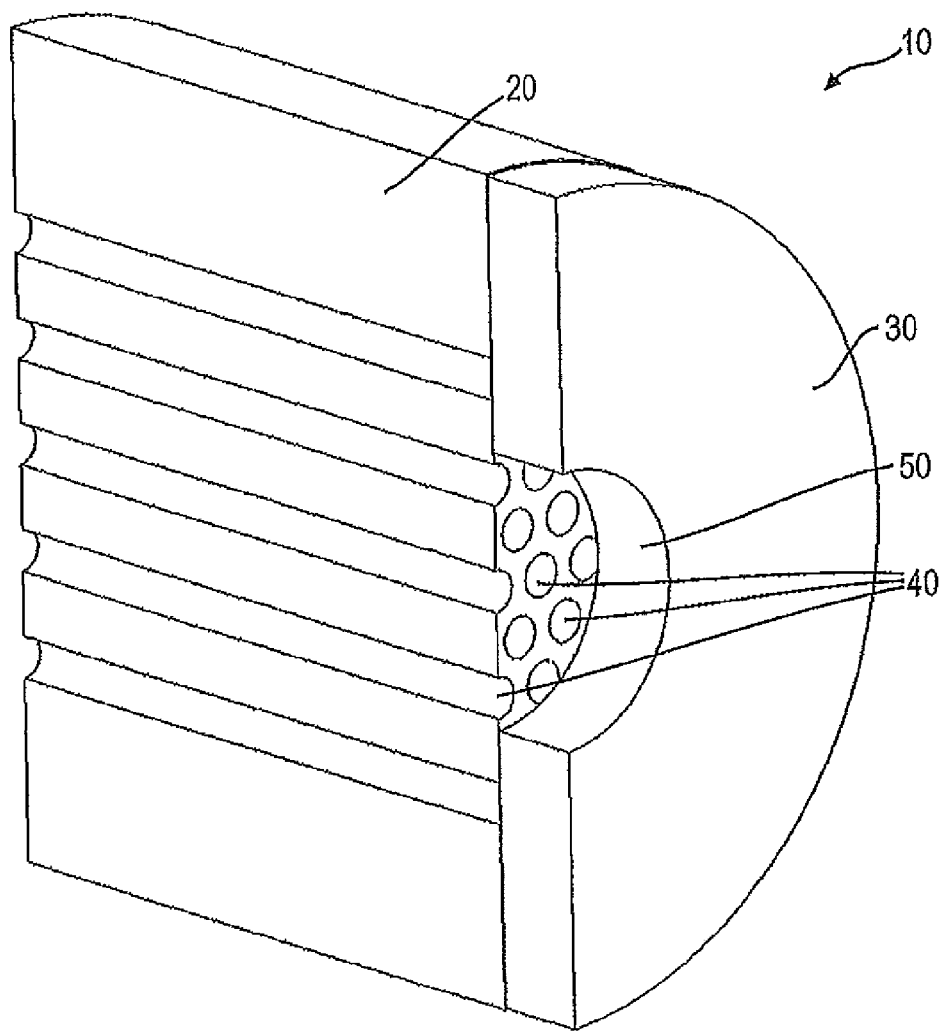
FIG. 1 shows a sectional drawing of a modularly structured unit made up of a flow resistance element and an orifice plate.

FIG. 1 illustrates a sectional drawing of a modularly structured unit 10 made up of a cylindrical flow resistance element 20 and an orifice plate 30 adjacent thereto. The flow resistance element 20 includes a multitude of parallel ducts 40 which extend through the flow resistance element 20 from one circular end face to the other. The orifice plate 30 is in the shape of a disk which has an opening 50 and which covers a certain number of ducts 40 and exposes a certain number of ducts 40 of the flow resistance element 20. Depending on the desired flow rate, the flow resistance element 20 is combined with an orifice plate 30, the orifice plate 30 having an appropriately smaller or larger diameter for opening 50.

The flow resistance element 20 in FIG. 1 includes an array of parallel bore holes having circular cross-sections. This type of flow resistance element is particularly suitable when low flow rates are desired.

Figure 2:
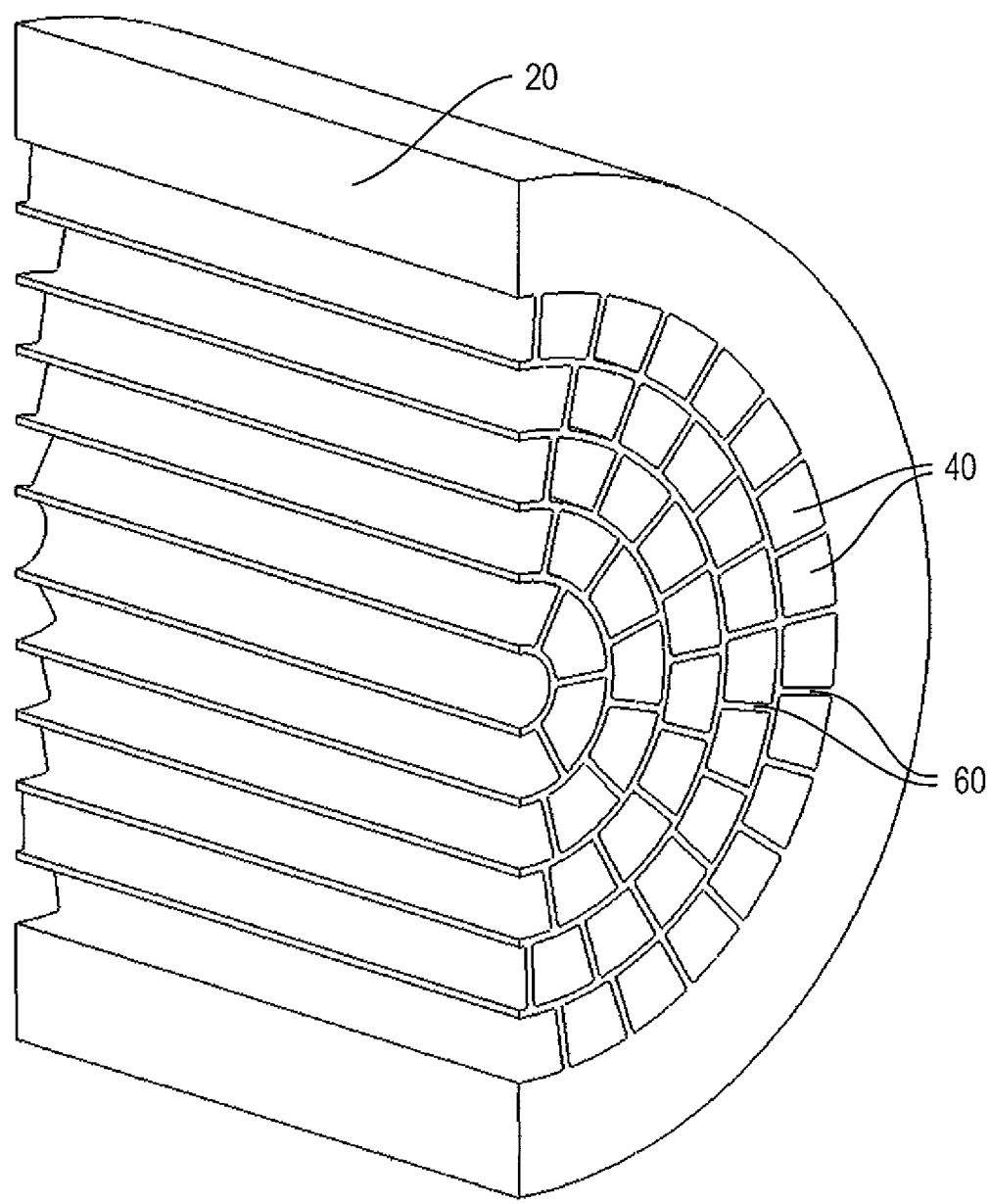
FIG. 2 shows a sectional drawing of a flow resistance element having a small duct wall thickness.

FIG. 2 shows a flow resistance element 20 having parallel ducts 40 adjacent to each other, the wall thicknesses of the walls 60 between neighboring ducts 40 amounting to between 0.5 mm and 0.05 mm. This flow resistance element 20 has a large opening cross-section and is suitable particularly for high flow rates.

The flow resistance element 20 is preferably produced by photopolymerization from a plastic material by growing in layers over an appropriate mask. This has the advantage that the desired small wall thicknesses can be realized, very small tolerances can be observed, and almost any desired duct geometries can be implemented at comparatively low cost.

The duct cross-section of the flow resistance element 20 is approximately trapezoidal. But other geometries are also conceivable.

Figure 3:
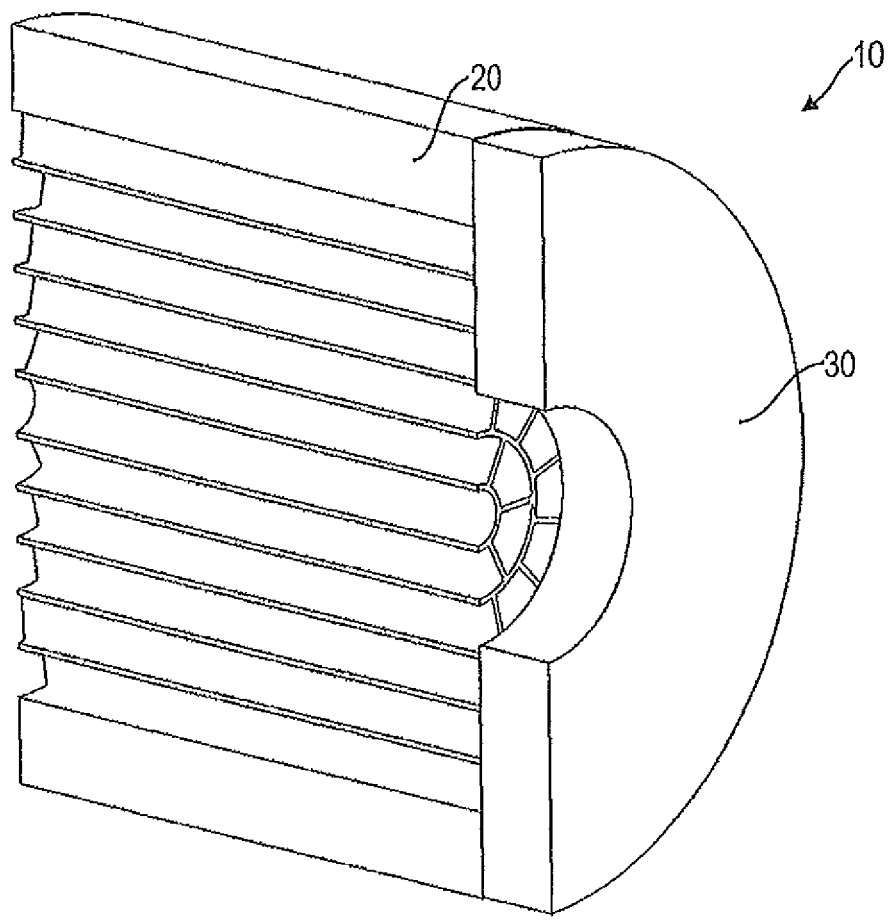
FIG. 3 shows a sectional drawing as in FIG. 2 with an orifice plate.

As is illustrated in FIG. 3, a unit 10 is also modularly built up of the flow resistance element 20 according to FIG. 2 and the orifice plate 30, with the order of the two components not being important when they are built into the main flow duct of a thermal mass flow rate measuring or control device.

Although the invention has been described hereinabove with reference to a specific embodiment, it is not limited to this embodiment and no doubt further alternatives will occur to the skilled person that lie within the scope of the invention as claimed.

What is claimed is:

1. A modularly structured flow conditioning unit comprising:
   a flow resistance element built up of a multitude of parallel and adjacent ducts;
   an orifice plate in immediate contact with the flow resistance element and adapted to be used in a main flow duct of a thermal mass flow rate measuring or control device, wherein the orifice plate only includes one opening wherein the one opening comprises a center opening, and wherein the flow resistance element is adapted to be combined with various orifice plates having different diameters for the center opening;
   wherein the flow resistance element includes first and second end faces with the multitude of parallel and adjacent ducts extending through the flow resistance element from the first end face to the second end face, and wherein each of the orifice plates is configured to contact at least one of the first and second end faces to cover a first plurality ducts of the multitude of parallel and adjacent ducts, leaving a second plurality of the multitude of parallel and adjacent ducts uncovered: and
   wherein one entire side of the orifice plate forms a contact surface that is in direct abutting contact with the flow resistance element over an entirety of the contact surface.

2. The modularly structured flow conditioning unit according to claim 1, wherein the multitude of parallel and adjacent ducts are defined by walls having wall thicknesses of from 0.5 mm to 0.05 mm.

3. The modularly structured flow conditioning unit according to claim 2, wherein the flow resistance element comprises a photopolymerized element of a plastic material comprised of layers grown over an appropriate mask.

4. The modularly structured flow conditioning unit according to claim 3, wherein the flow resistance element includes ducts having an approximately trapezoidal cross-section.

5. The modularly structured flow conditioning unit according to claim 1, wherein one single flow resistance element having a large opening cross-section cooperates with a respective one of a plurality of orifice plates, with each plate comprising a disk having only the one opening, and wherein the one opening is defined by a diameter determining a maximum rate of flow.

6. The modularly structured flow conditioning unit according to claim 1, wherein the orifice plate is arranged in a flow direction immediately upstream or downstream of the flow resistance element and is in direct abutting contact therewith.

7. A modularly structured flow conditioning unit comprising:
   a flow resistance element including a plurality of parallel and adjacent ducts;
   an orifice plate in immediate contact with the flow resistance element, the orifice plate only including one opening, wherein the one opening comprises a center opening defined by a diameter, and wherein the flow resistance element is adapted to be combined with a selected one of a plurality of orifice plates, with each orifice plate only including the one opening and each orifice plate having this one opening comprising the center opening, and wherein each center opening of the plurality of the orifice plates is defined by a different diameter to provide a desired flow rate;
   wherein the selected one of the plurality of orifice plates is configured to contact an end face of the flow resistance element to cover a first plurality of the ducts and leave a second plurality of the ducts uncovered; and
   wherein one entire side of the orifice plate forms a contact surface that is in direct abutting contact with the flow resistance element over an entirety of the contact surface.

8. The modularly structured flow conditioning unit according to claim 7, wherein the flow resistance element and orifice plate are adapted to be used in a main flow duct of a thermal mass flow rate measuring or control device.

9. The modularly structured flow conditioning unit according to claim 7, wherein the flow resistance element comprises a single body that includes the plurality of parallel and adjacent ducts which cooperate with each other to define an opening cross-section, the single body having one of a large opening cross-section for a high flow rate or a small opening cross-section for a low flow rate.

10. The modularly structured flow conditioning unit according to claim 9, wherein the selected one of the plurality of orifice plates comprises one of a first orifice plate having a smaller diameter center opening to cover a first number of duct openings in the single body or a second orifice plate having a larger diameter center opening to cover a second number of duct openings in the single body that is less than the first number.

11. A method of assembling a modularly structured flow conditioning unit comprising the steps of:
   (a) providing a flow resistance element;
   (b) selecting one of a plurality of orifice plates each having a center opening defined by a different diameter to provide a desired flow rate when combined with the flow resistance element; forming each orifice plate as a disk having only one opening wherein the one opening is the center opening; and
   (c) disposing the selected orifice plate in immediate contact with the flow resistance element.

12. The method according to claim 11, including positioning the orifice plate selected in step (b) adjacent to the flow resistance element in a main flow duct of a thermal mass flow rate measuring or control device.

13. The method according to claim 11, wherein the flow resistance element includes first and second end faces, and including forming the flow resistance element to include a plurality of parallel ducts which extend through the flow resistance element from the first end face to the second end face.

14. The method according to claim 13, including abutting a selected one of the plurality of orifice plates against one of the first and second end faces to cover up a certain number of the parallel ducts and leaving the remaining plurality of parallel ducts uncovered.

15. A modularly structured flow conditioning unit assembly comprising:
   a flow resistance element, wherein the flow resistance element includes a plurality of parallel ducts; and
   a plurality of orifice plates having different opening diameters, wherein each orifice plate is adapted to be used in a main flow duct of a thermal mass flow rate measuring or control device, wherein each orifice plate comprises a disk having only one opening, and wherein a selected one of the plurality of orifice plates is configured to contact an end face of the flow resistance element to cover a first plurality of the parallel ducts, leaving a second plurality of the parallel ducts uncovered at the one opening, and wherein the flow resistance element is adapted to be combined with each orifice plate such that each one of the orifice plates can be arranged in immediate contact with the flow resistance element to amend the flow resistance.

16. The modularly structured flow conditioning unit assembly according to claim 15, wherein the flow resistance element includes first and second end faces, and wherein the plurality of parallel ducts extend through the flow resistance element from the first end face to the second end face.

17. The modularly structured flow conditioning unit according to claim 7, wherein each orifice plate comprises a disk having only the one opening.

18. The method according to claim 11, wherein step (c) further includes forming one entire side of the orifice plate as a contact surface that is in direct abutting contact with the flow resistance element over an entirety of the contact surface.

19. The modularly structured flow conditioning unit assembly according to claim 15, wherein one entire side of the orifice plate forms a contact surface that is in direct abutting contact with the flow resistance element over an entirety of the contact surface.

* * * * *